G. A. BURNHAM.
TIME LIMIT DEVICE FOR ELECTRIC SWITCHES.
APPLICATION FILED DEC. 18, 1916.

1,259,454.

Patented Mar. 12, 1918.

Inventor.
George A. Burnham
by Boyer & Harriman
Attys.

G. A. BURNHAM.
TIME LIMIT DEVICE FOR ELECTRIC SWITCHES.
APPLICATION FILED DEC. 18, 1916.

1,259,454.

Patented Mar. 12, 1918.
2 SHEETS—SHEET 2.

Inventor,
George A. Burnham
By Bryce Harriman
Attys.

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

TIME-LIMIT DEVICE FOR ELECTRIC SWITCHES.

1,259,454.  Specification of Letters Patent.  Patented Mar. 12, 1918.

Application filed December 18, 1916. Serial No. 137,562.

*To all whom it may concern:*

Be it known that I, GEORGE A. BURNHAM, a citizen of the United States, residing at Saugus, in the county of Essex and State of Massachusetts, have invented an Improvement in Time-Limit Devices for Electric Switches, of which the following is a specification.

In a selective time-limit controlling device for electric switches, such as shown in my application #738,161, filed December 23, 1912, a switch operating mechanism is provided for operating a switch in the circuit to be controlled, an electric-motor is employed for actuating the same, into and out of engagement with which said mechanism is movable, a switch is provided for controlling the circuit of the motor which is normally open and when closed will cause the motor to operate, and means are provided for moving the switch operating mechanism into engagement with the motor and for closing the switch to cause the motor to operate, which means is adapted for operation on predetermined electrical conditions in the main circuit, as for instance an overload.

The closing of the controlling switch for the motor and the engagement of the switch-operating mechanism with the motor are substantially simultaneous, so that when the motor starts it also starts to move the switch-operating mechanism. Some objection has been found to starting the motor under this load; and the present invention has for its object to provide for closing the switch for the motor in advance of causing engagement of the switch-operating mechanism with the motor, so that at the moment of such engagement the motor will be running.

A simple manner of carrying out my invention is the provision of a switch for closing the circuit of the windings of the motor armature, said switch having a yielding spring element so disposed that it may be engaged by its fellow member and the circuit closed, and will then yield to admit of the engagement of the switch-operating mechanism with the motor. Such a structure enables the movable switch member and the switch-operating mechanism to be moved by a single element. Moreover, such element may be arranged to respond to a predetermined overload, as for instance it may be arranged in the magnetic field of the motor, wherein the field windings are arranged for a flow of current from the circuit to be controlled, in proportion of the the value thereof.

Fig. 4 is a circuit diagram to be referred to.

Figure 1:
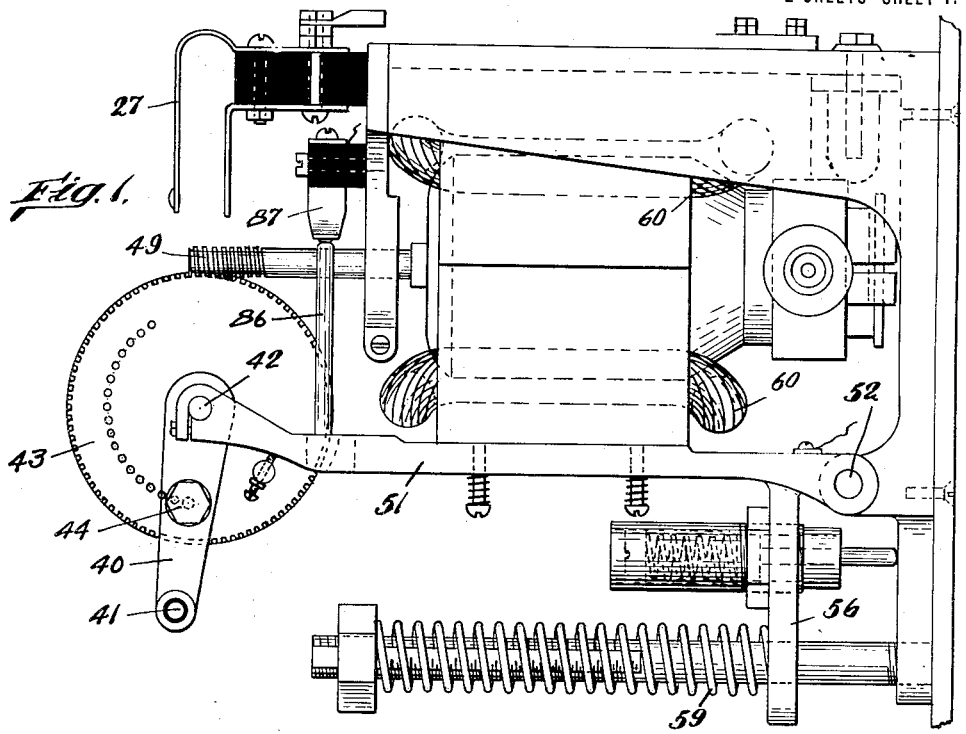
Figure 1 is a side elevation of one form of time-limit relay for controlling electric switches embodying this invention, the switch for the motor being closed, and the switch-operating mechanism for the circuit to be controlled being in engagement with the motor.

The general structure of the device, here shown for the purpose of illustrating my invention, is similar to that of my Patent #1,041,716, dated October 12, 1912, but the novel features of my present invention may be arranged in connection with other forms of time-limit controlling devices.

Referring to the drawings, the switch-operating device comprising a yoke or arm 40, with a cross-piece 41 for engagement with a circuit-closing member 27, a shaft 42 upon which said arm is loosely mounted, a worm-wheel 43 arranged on said shaft, and screw 44 for detachably connecting said arm with the worm-wheel; a movable part or member 51 of the field-frame of an electric-motor, pivoted at 52, and bearing said switch-operating device; a worm 49 into and out of engagement with which said worm-wheel is movable, which is arranged on the shaft of the armature of said motor, are all substantially as shown in the patent referred to.

Herein the field coils 60, which are arranged on the field frame of the equivalent exciting coils of the motor are arranged in a transformer circuit 70, or equivalent circuit, so arranged that current flows through said coils from the main circuit to be controlled in proportion to the value of the current. It is designed that the movable part or member 51 of the field frame shall respond to any amperage of current for which the device may be set, and adjustment to this end is provided for said movable part or member, which, as here shown, consists of an ear 56, on the member 51, arranged for engagement with a spring 59, having adjusting-means associated with it, as in said patent. As the movable part or member responds to the magnetic influence of the field the switch-operating mechanism will be moved into engagement with its actuator, but such movement will not occur until the magnetic field is of at least a given strength due to an overload of at least a given value, or a predetermined condition. Thus it will be seen that the engagement of the switch-operating mechanism with the motor is controlled by an overload.

The electric motor here shown is of the repulsion type adapted for operation when its armature is short circuited, and herein the armature winding of the motor is arranged in a circuit 85, which is inductively related to the field coils, which circuit is adapted to be opened and closed by a switch for the purpose of starting the motor. The switch here shown comprises the movable switch member 86, and the stationary switch member 87, which latter is made resilient so that when engaged by the movable switch member to close the circuit it will yield to admit of further movement of said movable switch member. Said movable switch member is adapted for movement upon a predetermined overload thereby to close the circuit of the armature and start the motor in operation on the occurrence of a predetermined overload, and, as here shown, said movable switch member is or may be connected with the movable part or member 51 of the field-frame of the motor or other movable means which may be employed in lieu thereof, so that when said part or member or equivalent movable means is moved in response to an overload of at least a given value or amperage, said member will be moved and the circuit 85 of the armature closed, thereby starting the motor. Hence the starting of the motor and also the operation thereof is controlled by an overload, and upon cessation of the overload the circuit will be opened and the motor will cease operating. This form of motor is of particular advantage for the reason that the necessity of providing overload relays to control the circuit of the motor is avoided.

From the foregoing description it will be noted that both the movable switch member and the switch-operating mechanism are carried by the part or member 51 of the motor, but my invention is not limited to the employment of such single supporting or moving means for said element, as it will be understood that my invention is operative so long as the switch-operating mechanism is movable into and out of engagement with the motor by means controlled by an overload and the movable switch member is movable into and out of closed circuit position by means controlled by an overload.

Figure 2:
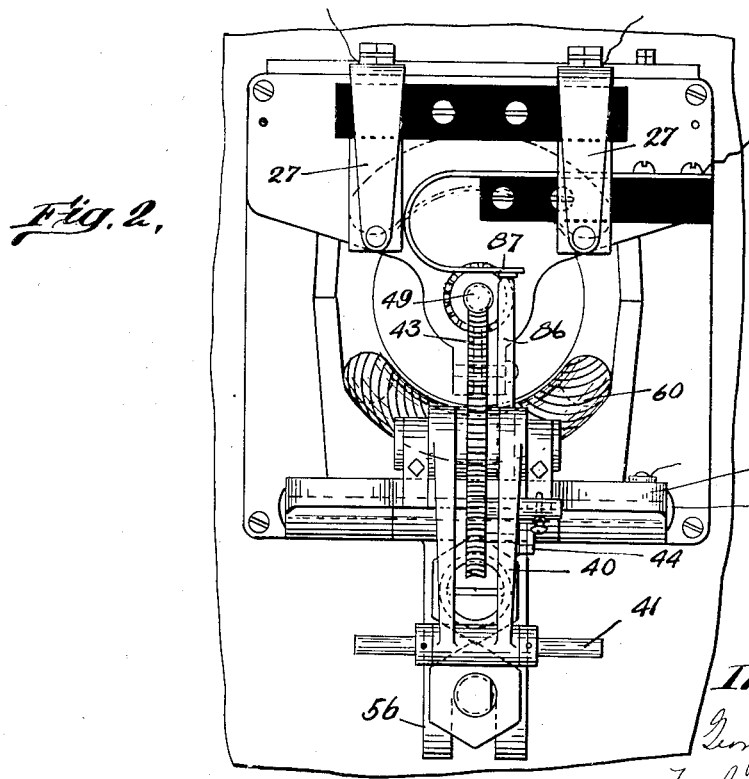
Fig. 2 is an end elevation of the same.
Figure 3:
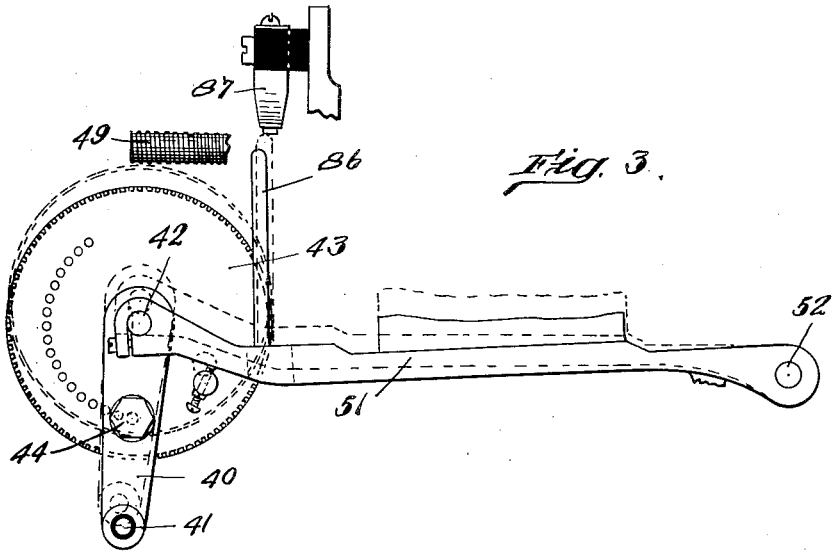
Fig. 3 is a fragmentary detail illustrating the switch for the motor in open circuit position, and the switch-operating mechanism disengaged from the motor.
Figure 4:
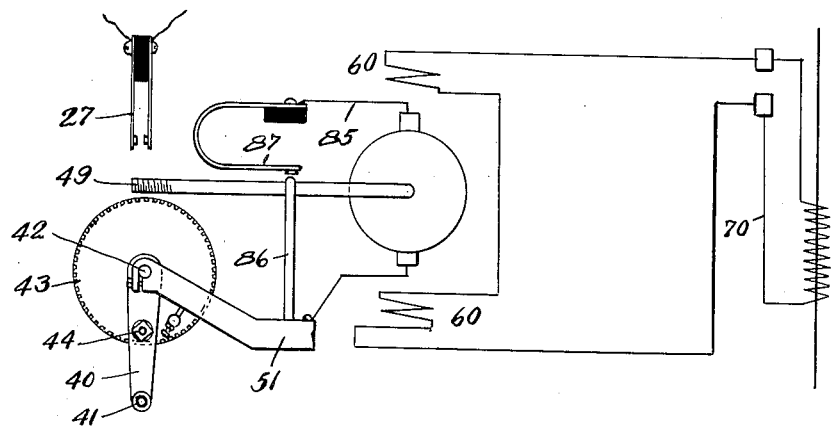

In the structure here shown the switch-operating mechanism engages the member, that is to say, its worm-wheel engages the worm when the part or member 51 is moved into its full attracted position, as shown in Figs. 1 and 2, although normally being held out of engagement, as shown in Fig. 3, by the force of gravity or other force, but the movable switch member although borne by said part or member 51 will engage its yielding switch member during the movement of said part or member, that is to say, before said member arrives at its full attracted position, and consequently before the switch-operating mechanism engages the motor, and, as a result, the circuit 85 of the armature of the motor will be closed in advance of the engagement of the switch-operating mechanism with the motor, and the motor will start to operate before such engagement takes place, so that said mechanism will engage the motor after it has started and while it is running. This insures the motor starting free from a load upon it.

I claim:—

1. A time-limit device for electric switches consisting of a switch-operating device, an actuator therefor into and out of engagement with which said operating-device is movable, an electric motor for controlling said actuator, which is responsive to an overload current, and means associated with said motor and responsive to an overload current, which is arranged to start said motor upon an overload of at least a given value, and to move said operating-device into engagement with its actuator, after the motor has started.

2. A time-limit device for electric switches consisting of a switch-operating device, an actuator therefor into and out of engagement with which said operating-device is movable, an electric motor for controlling said actuator, which is responsive to an overload current, means associated with said motor and responsive to an overload current which is arranged to start said motor upon an overload of at least a given value, and to move said operating-device into engagement with its actuator after the motor has started, and means arranged to vary the value of the overload at which said starting and moving-means is responsive.

3. A time-limit device for electric switches consisting of an operating-device requiring a prolonged period of time to operate the switch, an actuator therefor, an electric motor for controlling said actuator, which is responsive to an overload current, a controlling-switch for the circuit of the armature of said motor, and means responsive to an overload current arranged to operate said controlling-switch to close its circuit upon an overload of at least a given value, to start the motor and to move said operating-device into engagement with its actuator after the motor has started, which permits the return of said switch to normal and of disengagement of the switch-operating device when the overload ceases.

4. A time-limit device for electric switches consisting of an operating-device for the switch, an actuator therefor into and out of engagement with which said operating-device is movable, an electric motor for driving said actuator, which is responsive to an overload current, a controlling-switch for the circuit of the armature of said motor, a movable part of the field-frame of said motor bearing the movable member of said controlling-switch and also controlling the engagement of said operating-device with its actuator, said movable part adapted to be moved by the attractive influence of the field upon the occurrence of an overload of at least a given value, to close said controlling-switch to start the motor and to move said operating-device into engagement with its actuator after said motor has started.

5. A time-limit device for electric switches, consisting of a switch-operating device, an actuator therefor into and out of engagement with which said operating-device is movable, an electric motor for controlling said actuator, the exciting coils of which are included in a circuit responsive to an overload current, and the armature of which has its windings arranged in a circuit inductively related to the aforesaid circuit, and means controlled by said exciting coils and responsive to an overload of at least a given value to close the circuit of said armature and to start the motor, and to move the operating device into engagement with its actuator after the motor has started.

6. A time-limit device for electric switches consisting of an operating-device requiring a prolonged period of time to operate the switch, an actuator therefor into and out of engagement with which said operating-device is movable, an electric motor for said actuator, the field-magnets of which are included in a circuit responsive to an overload, and movable means associated with said motor and adapted to control the starting thereof by closing the circuit of the armature when the field-magnets have become magnetized by an overload of at least a given value, said movable means also controlling the engagement of the operating-device with its actuator after the motor has started.

7. In a time-limit switch-controller, a switch-operating device arranged to operate a switch when actuated a predetermined distance, having an engaging-portion adapted to engage the rotary portion of a motor, a switch adapted to close an electric circuit derived from the circuit to be controlled, to actuate the motor, a rotary electric motor having a portion adapted to be moved by eletromagnetic attraction of a part on the occurrence of a predetermined overload on the circuit to be controlled, and close the switch which controls the actuation of the motor to cause the switch-operating device to be connected with the rotating portion of said motor, after the motor has started.

8. In a time-limit switch-controller, an electric motor having a member arranged to rotate on the occurrence of a predetermined overload, a switch-operating member arranged to operate a switch when actuated a predetermined distance having an engaging-portion to connect said switch-operating member with the rotary portion of said motor to be actuated thereby, a switch adapted to close a circuit derived from the circuit to be controlled to actuate the motor, a single electromagnetically-operated device arranged to close the switch which controls the actuation of the motor on the occurrence of a predetermined overload on the circuit to be controlled and to connect said switch-operating device with the rotary portion of said motor, after the motor has started.

9. In a time-limit controlling-device for electric circuits, a rotary electric motor having field coils through which current flows from the circuit to be controlled and in proportion to the value thereof, and an armature having the circuit of its windings normally open, but adapted to be closed by a switch adapted to close the circuit of said armature windings to cause the motor to rotate on the occurrence of a predetermined overload on the main circuit, an operating-device adapted to close a switch controlling the main circuit normally disengaged from the motor, and means adapted to be moved by the magnetic effect of the field on the occurrence of a predetermined load on the main circuit to close the switch of the circuit of the armature winding to cause the motor to rotate and to cause said operating-device to be connected with the rotary portion of said motor, after said motor has started, to be actuated thereby to close the switch controlling the main circuit.

10. A time-limit device for electric switches consisting of a switch-operating device, an actuator therefor into and out of engagement with which said operating-device is movable, an electric-motor for driving said actuator, a controlling switch for said motor, and means responsive to an overload current for moving the movable member of said controlling-switch to start the motor, and for moving the operating-device into engagement with its actuator, after the motor starts.

11. A time-limit device for electric switches consisting of a switch-operating device, an actuator therefor into and out of engagement with which said operating-device is movable, an electric-motor for driving said actuator, a controlling-switch for said motor, and means responsive to an overload current for moving the movable member of said controlling-switch to start the motor, and for moving the operating-device into engagement with its actuator, after the motor starts, said means permitting the switch-operating device and also the movable member of the controlling-switch for the motor to return to normal upon cessation of the overload.

12. A time-limit device for electric switches consisting of a switch-operating device, an actuator therefor into and out of engagement with which said operating-device is movable, an electric motor for driving said actuator, a controlling-switch for said motor comprising a movable member and a yielding member, movable means responsive to an overload current for moving the movable member of said controlling-switch into engagement with said yielding element, to start the motor, and for moving the operating-device into engagement with its actuator, after the motor starts, the yielding element of the controlling-switch yielding to permit such movement of the movable-means.

13. A time-limit device for electric switches comprising a switch-operating device, an actuator therefor into and out of engagement with which said operating-device is movable, an electric motor for driving said actuator, a controlling-switch for the armature of said motor, comprising a movable member and a yielding-member, movable supporting-means for said switch-operating device and movable switch-member, responsive to an overload current of at least a given value, movement of which upon occurrence of such overload moves the movable-member of a controlling-switch into engagement with the yielding-member to start the motor, and continuation of such movement which is permitted by the yielding-member of the controlling-switch moves the switch-operating device into engagement with its actuator, so that engagement is effected when the motor is running.

In testimony whereof, I have signed my name to this specification, in the presence of two subscribing witnesses.

GEORGE A. BURNHAM.

Witnesses:
HAROLD S. RAMSAY,
DANIEL M. SCHIFFERT.